United States Patent [19]

Nott

[11] 3,980,240
[45] Sept. 14, 1976

[54] BRIGHTENING OF NATURAL CALCITIC ORES

[75] Inventor: Alan J. Nott, Crantock near Newquay, England

[73] Assignee: Anglo-American Clays Corporation, Sandersville, Ga.

[22] Filed: Apr. 11, 1975

[21] Appl. No.: 567,138

[52] U.S. Cl. .................................... 241/20; 241/24
[51] Int. Cl.² ........................................ B02C 23/18
[58] Field of Search .............. 241/4, 15, 16, 20, 21, 241/24, 29; 210/222

[56] References Cited
UNITED STATES PATENTS

| | | | |
|---|---|---|---|
| 2,287,440 | 6/1942 | McCleary | 241/24 X |
| 3,307,790 | 3/1967 | Cohn et al. | 241/20 X |
| 3,512,722 | 5/1970 | Hall | 241/24 |
| 3,604,634 | 9/1971 | Windle | 241/16 |
| 3,627,678 | 12/1971 | Marston et al. | 210/222 |
| 3,819,515 | 6/1974 | Allen | 210/222 X |

*Primary Examiner*—Granville Y. Custer, Jr.
*Attorney, Agent, or Firm*—Stefan J. Klauber

[57] ABSTRACT

A method for brightening a natural calcitic ore by removal of discoloring contaminants. The ore is crushed and formed into an aqueous slurry, which slurry is then coarse-milled to produce a product wherein no more than 1 percent of the particulate matter is +325 mesh. This coarse-milled product is then subjected to a further, wet-milling step, to alter the particulate such that at least 70 percent of the particles are less than 2 microns, thereby liberating substantial quantities of the discoloring contaminants. The liberated impurities are thereupon separated from the slurry by flotation and/or by subjecting the slurry to a high intensity magnetic field.

13 Claims, No Drawings

BRIGHTENING OF NATURAL CALCITIC ORES

BACKGROUND OF INVENTION

This invention relates generally to pigments, and more specifically relates to a process for producing high brightness pigments by beneficiation of naturally occurring calcium carbonate.

Calcium carbonate pigments find application in a wide variety of industrial and other environments. Such pigments, for example, are widely utilized as fillers in the manufacture of rubber, paper, and of various plastics, and as extenders in paint formulations. Such pigments, furthermore, either alone or in combination with other pigments, are widely utilized for paper coating applications. In many of the aforementioned applications, particularly e.g. where the pigments are used for coating, it is desirable that the calcium carbonate be as bright as possible.

In addition it is desirable in many applications, to utilize a calcium carbonate of high purity, for reasons other than brightness alone. For example, in the preparation of certain insulating compositions, calcium carbonate is used as an extender; and if metallic impurities such as pyrites are present, the electronic properties of the product can be adversely affected.

High purity, high brightness calcium carbonate pigments have long been produced by chemical processes, pursuant to which the said carbonates are prepared as precipitates. The processes, however, are comparatively complex, and are not well-suited to large scale or low cost operations. Interest for such reason has long centered upon possible use of naturally occurring calcium carbonate, particularly in that the natural calcitic minerals are extremely abundant in virtually all parts of the world, — and therefore represent a ready source of inexpensive raw material. In practice, however, it is found that very many of the calcitic deposits are so highly contaminated with discolorants, that when comminuted in their natural state they are simply unacceptable as pigments. Thus, in typical instances deposits which are primarily of calcite, may be contaminated with pyrites and with mica; both of which in varying degrees contribute to the discoloration of the otherwise relatively colorless calcium carbonate.

Various proposals have from time to time been advanced for processes directed at improving the brightness of the aforementioned naturally occurring calcium carbonates. Many of these prior proposals involve the use of flotation methods to remove impurities from calcitic ores. In the bulk of such prior art, interest has centered upon the removal of siliceous impurities, so as to improve the remaining compositions for use in cement manufacture.

In some instances too, flotation is recommended for improving the brightness characteristics of naturally occurring calcium carbonate. Thus in U.S. Pat. No. 3,512,722 a wetground natural calcium carbonate is subjected to a flotation step, after which the treated product is classified and further processed.

In some other instances, for example, in U.S. Pat. No. 2,287,440, it has been contemplated that magnetic separation techniques might be used to beneficiate naturally occurring calcitic ores, so as to improve the brightness thereof. In the case of the cited patent, the ore is ground and crushed, and then heated as a dry powder to increase the magnetic susceptibility. The dry powder is then subjected to magnetic separation, after which the purified product is wet-milled to produce the improved pigment.

By and large the techniques of the prior art as discussed, have not been particularly effective in producing high brightness calcium carbonate pigments from natural sources. Indeed in most instances where pigments are derived on a commercial scale from such natural sources, an ore is utilized which to begin with is of very high purity and relatively free from discoloring contaminants. Reference may be had in this connection, for example, to U.S. Pat. Nos. 3,661,610 and 3,674,529, which cite the use of calcium carbonate pigments derived from a raw, high purity natural chalk whiting. The natural whiting is subjected to a two-stage grinding process, it not being necessary in these instances to subject the product to purification steps.

In accordance with the foregoing, it may be regarded as an object of the present invention, to provide a process which enables the production of high quality bright calcium carbonate pigments, from naturally occurring calcitic ores containing relatively high levels of discoloring contaminants.

It is a further object of the present invention, to provide a process which enables notable brightness augmentation, even for natural calcitic deposits which are initially relatively free of discoloration.

SUMMARY OF INVENTION

Now in accordance with the present invention, the foregoing objects and others as will become apparent in the course of the ensuing specification, are achieved by a method pursuant to which the natural calcitic ores, such as a high calcium or dolomitic marble or so forth, is initially crushed, and is thereupon formed into an aqueous slurry. The slurry is then coarse-milled to produce a product wherein preferably no more than 1 percent of the particulate matter is +325 mesh. This initial coarse-milling may, for example, be effected by use of a ball mill. The product is then subjected to a further wet-milling step, the objective of which is to alter the particulate such that at least 70 percent (and preferably at least 90 percent) of the resultant particles are less than 2 microns. This fine milling step is preferably effected by sand grinding.

In consequence of the aforementioned steps, and especially of the fine milling step, substantial quantities of the discoloring contaminants, such as pyrites, mica or so forth, are liberated and in consequence are in a condition enabling their removal by subsequent separation steps. The separation steps may take the form of a froth flotation process, and/or subjection of the fine-milled slurry to a high intensity magnetic field. The said step of magnetic separation is particularly effective for use with the invention, and it is indeed preferable to employ such magnetic separation, either as the sole separating step or in conjunction with the aforementioned froth flotation.

Following the separation steps, the purified slurry may be dewatered to produce a dry powder if the pigment is desired in this form; or alternatively the slurry may be retained in aqueous form if it is to be so utilized for coating or other purposes.

DESCRIPTION OF PREFERRED EMBODIMENT

In order to demonstrate the efficacy of the present inventive process, a series of Examples illustrative thereof, will now be set forth. In Examples I through IV, and in Example VI, samples of Georgia calcite deposits were utilized, which samples were of high calcium content, and included as impurities, (among other elements) fine quartz, sand, mica and quantities of fine pyrites. In Example V the value of the invention is illustrated, for use in further purifying a ground marble, which is already relatively free of discolorants.

EXAMPLE I

A natural Georgia calcite sample in accordance with the preceding paragraph was subjected to preliminary crushing by a press, and thence was further crushed by use of a cone crusher. The product at this point included approximately 55 percent −60 mesh, and substantially 0 percent +10 mesh. The sample was thereupon formed into an aqueous slurry and ball-milled at 60 percent solids with 0.45 weight percent Dispex (based on dry weight of Dispex) until the product had no more than 1 percent on a 325 mesh screen. ("Dispex" is a trademark of Allied Colloids, Great Britain, for polymethacrylic salts.) 17 percent of the particulate at this point had an ESD less than 2 microns. The brightness of this product as determined on the standard G.E. scale was 89.8. In all instances in this specification it will be understood that brightness values are obtained according to the standard specification established by TAPPI procedure T-646m-54.

EXAMPLE II

The ball-milled product from Example I was thereupon subjected to a flotation treatment, utilizing as a collector potassium ethyl xanthate (Dow Z-3) at a concentration of 1 gram/thousand grams $CaCO_3$. The pH during the flotation treatment was approximately 9.0; solids were 20 percent; and no frother was utilized. The thus purified product displayed a G.E. brightness of 93.8.

EXAMPLE III

A portion of the ball-milled product from Example I (i.e. without flotation treatment), was subjected to a further fine-milling operation by wet-grinding the previously coarse-milled product with Ottawa sand. This fine grinding was effected at 70 percent solids, and for a time duration sufficient to reduce the particulate such that 90 percent of the particles had an equivalent spherical diameter (ESD) less than 2 microns. This ball-milled and sand-ground product was then found to display a G.E. brightness of 92.5.

EXAMPLE IV

The ball-milled and sand-ground product of Example III was further subjected to a flotation treatment, as previously described. In consequence, the resultant product displayed a G.E. brightness of 94.7. It is thus evident that the fine grinding step had released considerable contaminants beyond the release effected by ball-milling alone, which additional contaminants were then able to respond to the flotation treatment.

EXAMPLE V

In order to demonstrate the efficacy of high intensity magnetic separation pursuant to the present invention, a sample of a ground Italian marble produced by English Clays Ltd. under the tradename Carbital, was subjected to a magnetic separation step. The aforementioned Carbital, in comparison to the more highly contaminated calcitic ores in the preceding Examples, is of relatively high purity. The Carbital product is produced by subjecting the naturally occurring Italian marble to a crushing; and then to a preliminary grinding process in aqueous suspension in a pebble mill (to 1 percent −325 mesh). The resultant product is then ground in aqueous suspension with sand until at least 90 percent by weight is smaller than 2 microns ESD. The sample of this product thus utilized displayed an initial G.E. brightness of 94.2. The said product was thereupon subjected to a magnetic separation by forming same into an aqueous slurry at about 30 percent solids, and subjecting the slurry to a high intensity magnetic field by passing same through a steel wool matrix maintained in a magnetic field of approximately 15 kilogauss average intensity. The retention time in the field was about 1.2 minutes. The resultant product displayed a G.E. brightness of 98.5. This Example illustrates that even a relatively uncontaminated natural marble can be most substantially improved in brightness by the techniques of the invention.

EXAMPLE VI

For purposes of this Example, 1260 grams of the Georgia calcite sample utilized in Example I, was mixed with approximately 4200 grams of the aforementioned Carbital, and the resultant mixture was floated at 70 percent solids. The G.E. brightness of the feed, i.e. prior to flotation, was determined at 93.2, and the product brightness following flotation was 94.0 on the G.E. Scale.

EXAMPLE VII

The floated product from Example VI was passed through the magnetic separating instrumentality utilized in Example VI under the same field intensity conditions and for the same retention time as cited in the said Example. Brightness after this initial pass was determined at 94.8. The product was then diluted to 30 percent solids and subjected to a second pass through the separator — under identical conditions. The brightness on the G.E. scale was thereby increased to 98.5.

The magnetic separation step of the present invention is preferably brought about by passing the aqueous slurry through a slurry-pervious ferromagnetic matrix, while a high intensity magnetic field is applied at the matrix. The said field may be generated by electromagnets or by other field sources, which in typical apparatus utilized for these purposes, at least partially surround a non-magnetic canister in which the matrix is packed. The matrix material, as known in the art, preferably comprises a packed stainless steel wool, although other filamentary or strandlike materials may be effectively used for this purpose; as may matrices of steel balls, tacks, or of other slurry-pervious ferromagnetic materials. Apparatus of this general type may be noted, for example, in Marston, U.S. Pat. No. 3,627,678, although it is to be understood that the invention is in no sense limited to use with specific types of magnetic separating devices.

The average field intensity maintained at the matrix during the separation process is in the general range of 7 to 22 kilogauss, but a preferable field intensity during the separation process is about 15 to 20 kilogauss. Within the limits of magnetic separator technology higher field intensities can also be effectively utilized with the invention. The slurry is passed through the matrix at such a rate as to be maintained in the field for at least 15 seconds, with from ½ to 2 minutes retention time being preferred. Subject to the effect on processing rates, longer retention times are also acceptable, and can occur from either a single pass or via cumulative passes through the matrix. The slurry, as passed through the magnetic separator, typically includes from about 20 to 70 percent solids, with 20 to 40 percent solids bring preferred.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly the invention is to be broadly construed and limited only by the scope and spirit of the claims now appended hereto.

I claim:

1. A method for brightening and purifying a natural calcitic ore by removing discoloring contaminants therefrom, comprising the steps of:
   crushing said ore;
   forming said crushed ore into an aqueous slurry, and coarse-milling said slurry to produce a coarse-milled product;
   liberating substantial quantities of said discoloring contaminants by subjecting said coarse-milled product to a further wet-milling step to alter the particulate such that at least 70 percent of the particles are less than 2 microns; and
   separating the liberated contaminants from said further milled slurry, said separation being at least partially effected by subjecting said slurry to a wet magnetic separation in a high intensity magnetic field.

2. A method in accordance with claim 1, wherein said coarse-milling step effects comminution such that in the coarse-milled product no more than 1 percent of the particulate matter is plus 325 mesh.

3. A method in accordance with claim 1, wherein said wet-milling step alters the particulate such that at least 90 percent of the particles are less than 2 microns.

4. A method in accordance with claim 3, wherein said further milling step is effected by sand grinding of the product yielded by said coarse-milling step.

5. A method in accordance with claim 4, wherein said coarse-milling step is effected by ball-milling said slurry until no more than 1 percent of the particulate matter is plus 325 mesh.

6. A method in accordance with claim 1, further including the step of de-watering the purified slurry to yield a dry particulate.

7. A method in accordance with claim 1, wherein said separation step is at least partially effected by floating said impurities from said slurry.

8. A method in accordance with claim 7, wherein said magnetic separation follows said flotation.

9. A method in accordance with claim 1, wherein said magnetic separation is conducted by subjecting said slurry to a magnetic field having an average intensity of at least 15 kilogauss.

10. A method in accordance with claim 9, wherein said slurry is retained in the magnetic field from between ½ to 2 minutes.

11. A method for beneficiating natural calcitic ores by removing discoloring contaminants therefrom, comprising in sequence the steps of:
    crushing said natural ore;
    forming said crushed ore into an aqueous slurry, and coarse-milling said slurry to produce a product wherein no more than 1 percent of the particulate matter is plus 325 mesh;
    liberating substantial quantities of said contaminants by subjecting said coarse-milled product to a further wet-milling step to alter the particulate such that at least 90 percent of the particles are less than 2 microns; and
    separating said liberated impurities by subjecting said slurry sequentially to a flotation step and to magnetic separation in a high intensity magnetic field.

12. A method in accordance with claim 11, wherein said magnetic separation is effected in a field having an average intensity of at least 15 kilogauss.

13. A method in accordance with claim 12, wherein said slurry is retained in said magnetic field from between ½ to 2 minutes.

* * * * *